US007865492B2

(12) United States Patent
Fan

(10) Patent No.: US 7,865,492 B2
(45) Date of Patent: Jan. 4, 2011

(54) SEMANTIC VISUAL SEARCH ENGINE

(75) Inventor: Lixin Fan, Tampere (FI)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 11/237,229

(22) Filed: Sep. 28, 2005

(65) Prior Publication Data

US 2007/0073749 A1 Mar. 29, 2007

(51) Int. Cl.
*G06F 7/00* (2006.01)
(52) U.S. Cl. ............... 707/706; 707/708; 707/755; 707/796
(58) Field of Classification Search ............ 707/796, 707/706, 708, 999.03
See application file for complete search history.

(56) References Cited

U.S. PATENT DOCUMENTS

| | | | |
|---|---|---|---|
| 5,893,095 A | 4/1999 | Jain et al. | |
| 6,574,378 B1 * | 6/2003 | Lim | 382/305 |
| 6,901,411 B2 * | 5/2005 | Li et al. | 707/104.1 |
| 7,039,239 B2 * | 5/2006 | Loui et al. | 382/225 |
| 7,194,134 B2 * | 3/2007 | Bradshaw | 382/226 |
| 7,382,897 B2 * | 6/2008 | Brown et al. | 382/103 |
| 2003/0033347 A1 | 2/2003 | Bolle et al. | |
| 2003/0195883 A1 | 10/2003 | Mojsilovic et al. | |

FOREIGN PATENT DOCUMENTS

| | | |
|---|---|---|
| WO | WO96/42040 | 12/1996 |
| WO | WO-02/13067 | 2/2002 |

OTHER PUBLICATIONS

Daniel Stan, Mapping low-level image features to semantic concepts, Oakland University, Dec. 2000, 7 pages.*
Paul Viola, Rapid object detection using a boosted cascade of simple feature, Mitsubishi Electric Research labs, 2001, 9 pages.*
R.Porter, Robust rotation-invariant texture classification: wavelet, Gabor filter and GMRF based schemes, 1997, 9 pages.*
Stan and Sethi, Mapping low-level image features to semantic concepts. Proc. SPIE, 4315: 172-179, Dec. 2000 (ISSN 0277-786X).
International Search report for PCT Application PCT/IB2006/002687.
Object Class Recognition by Unsupervised Scale-Invariant Learning, Fergus et al., 13 pages.
Rapid Object Detection using a Boosted Cascade of Simple Features, Viola et al., Accepted Conference on Computer Vision and Pattern Recognition 2001, pp. 1-9.
Huang, J., et al. "An Automatic Hierarchical Image Classification Scheme." Proc. 6th ACM Int. Multimedia Conf., Sep. 12, 1998. pp. 219-228.
Sethi, I.K., et al. "Mining Association Rules between Low-level Image Features and High-level Concepts." Proc. of SPIE, vol. 4384, 2001.
Supplementary European Search Report dated Jul. 14, 2009.
Baoming Hong, "An Integrated Face Recognition System Based on Multiscale Local Discriminatory Features." Pattern Analysis & Applications, vol. 4, 2001, pp. 235-243.

* cited by examiner

*Primary Examiner*—John R. Cottingham
*Assistant Examiner*—Noosha Arjomandi
(74) *Attorney, Agent, or Firm*—AlbertDhand LLP

(57) ABSTRACT

An improved method, device and computer program product for enabling a system to learn, categorize and search items such as images and video clips according to their semantic meanings. According to the present invention, prominent features can be separated from low-level features in an item using supervised learning approaches. Prominent features are used to categorize and annotate new target items. Users can then use key words and/or template items for searching through the respective database.

23 Claims, 5 Drawing Sheets

LEARNING PROCESS:

CATEGORIZING PROCESS:

SEARCHING PROCESS (CASE 2):

SEMANTIC VISUAL SEARCH ENGINE

FIELD OF THE INVENTION

The present invention relates generally to visual information analysis and semantic searching. More particularly, the present invention relates to feature extraction, feature and object matching, and feature selection for content being stored in devices such as mobile electronic device.

BACKGROUND OF THE INVENTION

As multimedia databases of image files, video files, audio files, etc. on mobile devices have become progressively larger in recent years, the need for a comprehensive and accurate system for database categorizing, searching and management has greatly increased. In earlier mobile devices, memory space was greatly limited, resulting in a relatively low number of multimedia objects being stored on the device. With only a few objects being stored, accurate categorizing, searching and management was not of substantial importance. However, as memory capabilities have increased, mobile device users have been provided with the ability to store hundreds and even thousands of objects on a single device such as a mobile telephone. With so many stored objects, however, users can have an exceptionally difficult time finding a previously stored object or organizing all of his or her multimedia files for later access.

In the image retrieval field, existing content-based Image Retrieval (CBIR) systems search relevant images by searching for similar low-level features extracted from target images. One problem with this approach is that "similar low-level features" does not necessarily ensure "similar semantic contents." This is due to several factors. First, two "similar semantic contents" may ultimately have different appearances. For example, there can be intra-class object variation (e.g. mountains do not necessarily look similar). Second, "similar low-level features" may correspond to conceptually dissimilar objects. For example, a color histogram cannot easily distinguish a red roses from a sunset. Third, images always contain background clutter which often interferes low-level feature matching. While humans can easily identify prominent features from semantic similar contents (e.g., a face has dark elliptical regions representing eyes), it is still extremely difficult for computational algorithms to automatically separate prominent features from low-level features.

Although there have been a number of attempts to address the above issues through content-based image retrieval, each has its own drawbacks. For example, U.S. Pat. No. 5,893,095, issued to Jain et al., discloses a content-based image retrieval system based upon matching low-level features extracted from target images. Such "primitive" features include hue, a saturation and intensity histogram, edge density etc. However and as mentioned above, these low-level features do not always correspond to image semantics.

A general-purpose image identification/retrieval system was also previously developed for identifying an image according to four kinds of low-level features: average color, color histogram, texture and shape. Under this systems, users were capable of manually adding user-defined shapes and/or regions of interests within images to refine the search results. These user-specified features could often be more meaningful and could generate accurate results. However, entering these features is tedious and difficult for most users.

In addition to the above, there have been a number of attempts to enable machine learning for the purpose of feature selection. For example, one system involves the training of a face detector using the AdaBoost (short for "Adaptive Boosting" learning algorithm. Given a set of training face images, prominent facial features, such as high contrast regions around the foreheads and eyes, are automatically selected. Although this method demonstrates the feasibility of supervised learning for feature selection, it cannot be directly applied to image database retrieval due to the presence of background clutter.

In another approach, local prominent features are selected and then represented in a combined probabilistic model. This model effectively accommodates intra-class object variations. However, this method is computationally extensive and the number of selected features is therefore limited (to only six features in one implementation). This method cannot be directly applied to mobile applications.

SUMMARY OF THE INVENTION

The present invention provides for a semantic visual search engine for use in devices such as mobile telephones and other mobile electronic devices. With the present invention, prominent features can be separated from low-level features using supervised learning approaches. Prominent features are used to categorize and annotate new target images. Users can then use key words and/or template items for searching through the respective database.

With the present invention, relevant items such as images and video can be search based on "semantic" object classes. Additionally, with the present invention, the results form image and video coding search are both more accurate and more meaningful than the results generated by conventional systems.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
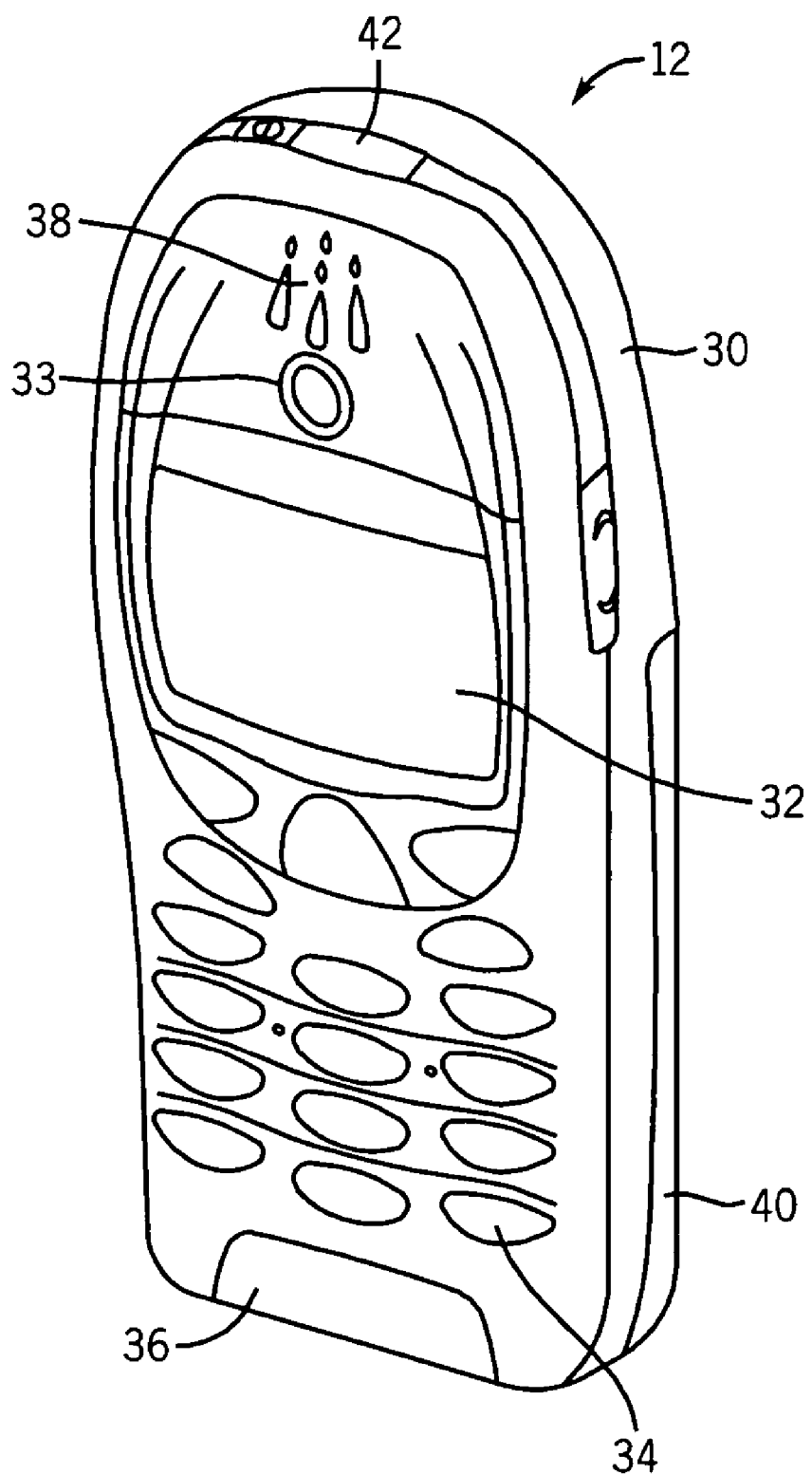
FIG. 1 is a perspective view of a mobile telephone that can be used in the implementation of the present invention.
Figure 2:
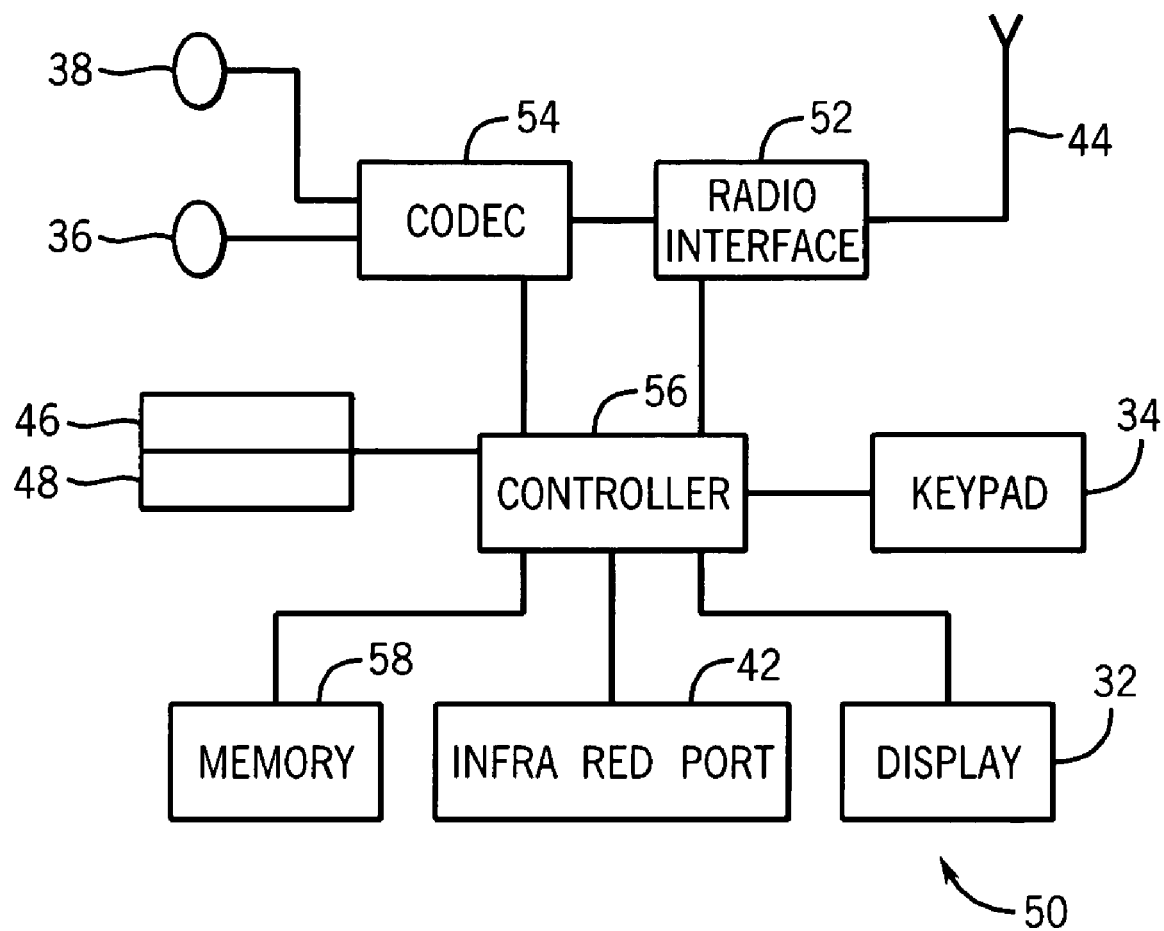
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. For example, the present invention can be incorporated into a combination personal digital assistant (PDA) and mobile telephone, a PDA, an integrated messaging device (IMD), a desktop computer, and a notebook computer. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 3A:
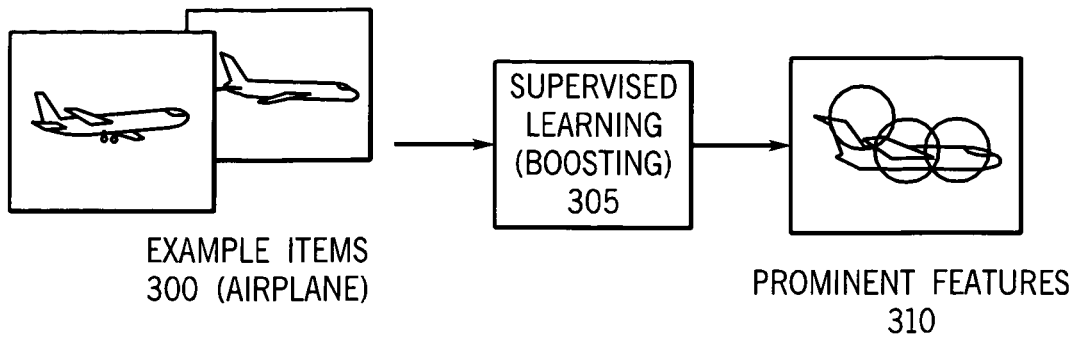
FIG. 3(a) is a diagram showing a learning process for a system implementing the principles of the present invention.

The searching system of the present invention comprises three related processes: learning, categorizing and searching. The learning process addresses the feature selection issues discussed previously by using supervised learning approaches. The input comprises a set of sample images of the same category (for example, images of faces). The outputs comprise common prominent features selected from low-level features that are derived from example images. FIG. 3(a) shows a simplified example of the learning process, where the input comprises a pair of sample items 300, and prominent features 310 are identified in the output as a result of a supervised learning process 305.

Figure 3B:
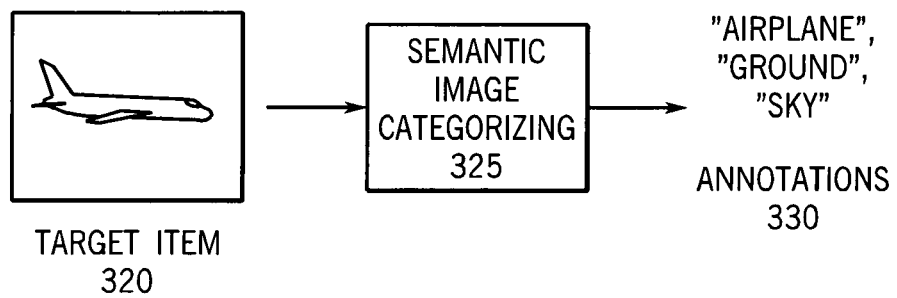
FIG. 3(b) is a diagram showing a categorizing process for a system implementing the principles of the present invention.

In the categorizing process, the prominent features identified during the learning process are used to categorize and annotate new target images. As shown in FIG. 3(b), the inputs comprise one or more target items 320, while the outputs comprise annotations 330 assigned to the target items 320. The outputs are generated as a result of a semantic image categorizing process 325.

Figure 3C:
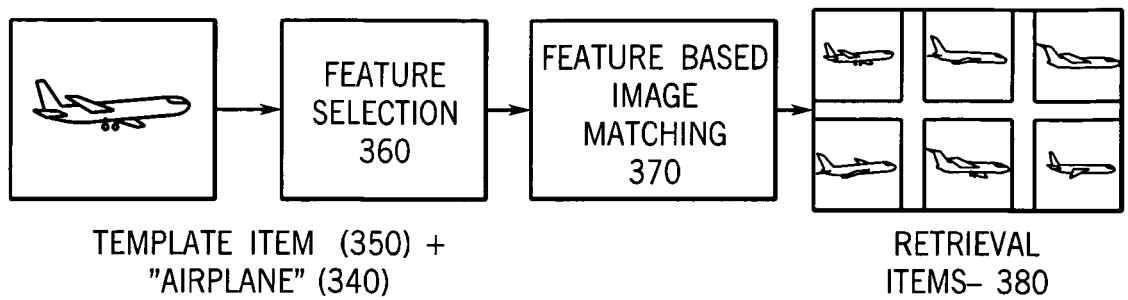
FIG. 3(c) is a diagram showing a searching process for a system implementing the principles of the present invention.

According to the present invention, different searching scenarios may be used. As depicted in FIG. 3(c), a user can submit a key word 340 and/or a template 350. The system then uses feature selection 360 and feature-based item matching 370 to return a plurality of retrieval items 380.

In a first of the searching scenarios, a user submits one or more key words. In response, retrieval items 380 with identical or similar annotations are returned. In a second scenario, both one or more template items 350 and one or more key words 340 are provided. In this situation, the low-level features extracted from the template item or items 350 are first pre-filtered, and then subsequently are matched with features of target items. The pre-filtering is used to eliminate or minimize background clutter. The most similar item or items are retrieved and made available to the user. In a third scenario, only one or more template items 350 are provided with no interested objects specified. In this scenario, the most similar low-level features are matched.

Figure 4:
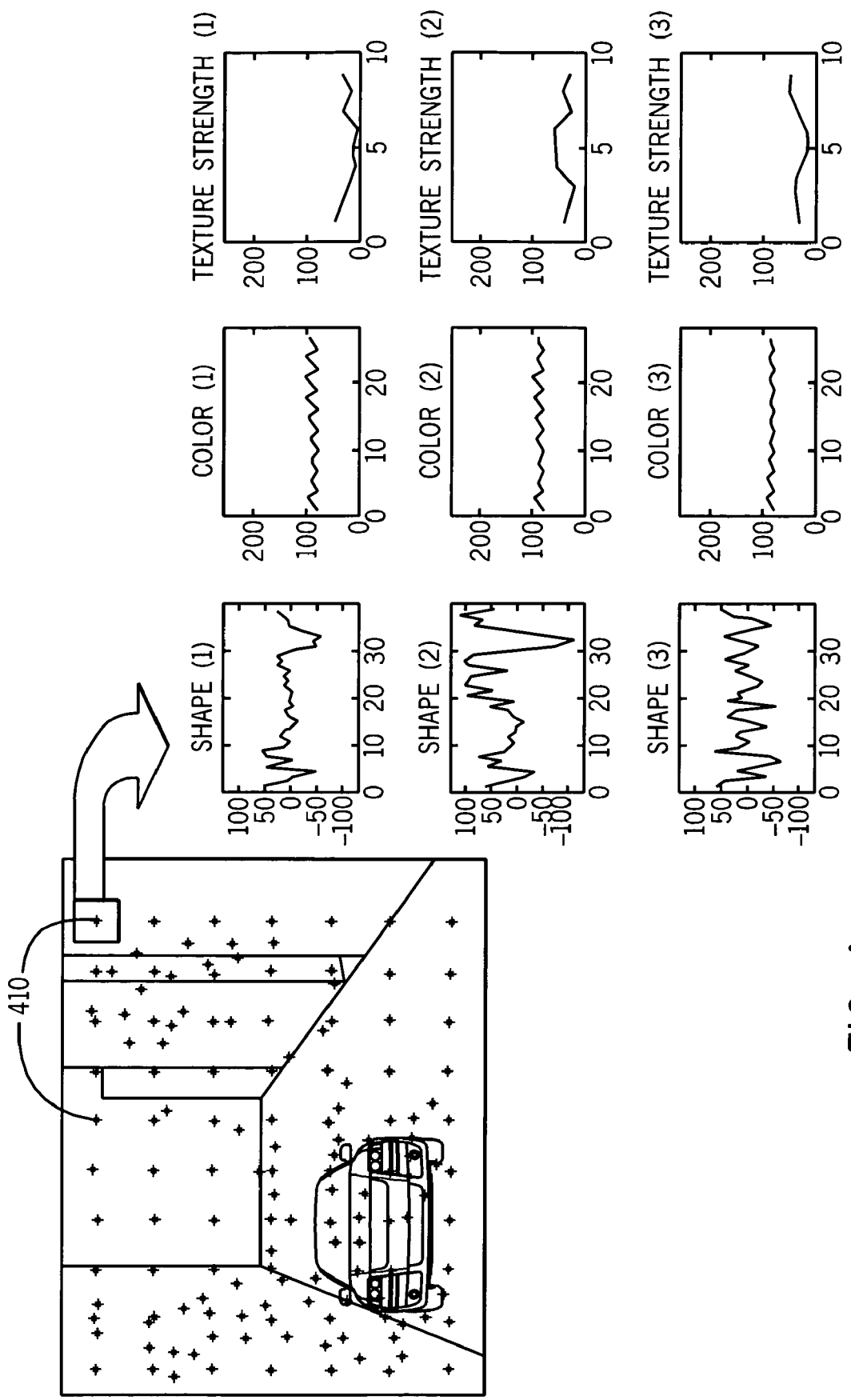
FIG. 4 is a representation of how low level features are extracted from an imaged according to one embodiment of the present invention.

For low level feature extraction, when images are involved, the images are converted into multi-scale local feature vectors, which comprise candidate low-level features to be processed. It should be noted that, although "images" are explicitly discussed herein, the present invention can also be applied to non-image content such as audio files. The low-level features are extracted locally around salient points in images. FIG. 4 is a representation of this process, where three different types of features (shape, color and texture strength) are extracted from various salient points 410 at three different scales.

For the learning process, the input is a set of example images for each category of semantic contents. The set of example images or items can number in the hundreds or more. The semantic contents comprise brief descriptions of potentially relevant items, such as "face," "airplane," "mountain," and others. Each example image is converted into multi-scale local feature vectors, which are candidate low-level features to be processed. Using supervised learning approaches, one can select prominent features associated with certain object classes (e.g. "eyes" for "face" or "wheel" for "car"). These selected features constitute a probabilistic model of certain object classes and can be used for subsequent categorizing and searching processes.

It should be noted that the present invention comprises a generic framework and does not depend upon the nature of the learning approaches that are implemented. In one embodiment of the invention, AdaBoosting is used to select features. AdaBoosting is an effective learning approach in the domain of visual feature selection. Nevertheless, alternatives learning approaches, including but not limited to Support Vector Machine (SVM) pattern recognition, Bayesian statistics, and others, can also be implemented with the present invention.

For the categorizing process, the target images are first converted into multi-scale local features. These extracted features are subsequently matched with prominent features, which are represented as a probabilistic model. If the computed probability is greater than certain thresholds, a successful match is declared and annotations of corresponding object categories are output. For example, if a target image being save by the user has at least a certain probability of containing a face, then one of the annotations that will be associated with the target image is "face." It should also be noted that probability thresholds are learned from example images or items in various embodiments of the invention. No user intervention is needed in this regard in one embodiment of the invention.

In the searching step and as discussed above, when both a template item and a key word are provided, the low-level features from the template item are first pre-filtered according to probabilistic models of interested categories. This pre-filtering is important to eliminate or minimize background clutter, which often interfere with the subsequent image matching process. The selected features are matched with target images or items of the same category. The matching makes use of a robust local feature-based image matching method. A particular method of this type is discussed in detail in "Intra-Class Variation, Affine Transformation and Background Clutter: Towards Robust Image Matching," by Lixin Fan and incorporated herein by reference.

If only a template image or item is provided with no interested objects specified, the searching process utilizes low-level feature based image matching as described herein. Again, a particular matching method is discussed in detail in "Intra-Class Variation, Affine Transformation and Background Clutter: Towards Robust Image Matching," by Lixin Fan. If only a keyword is input, then the system searches for stored images that have the same or a similar keyword as an annotation. For example, if the word "face" is input, then the system can return images that have "face" as an annotation.

Figure 5:
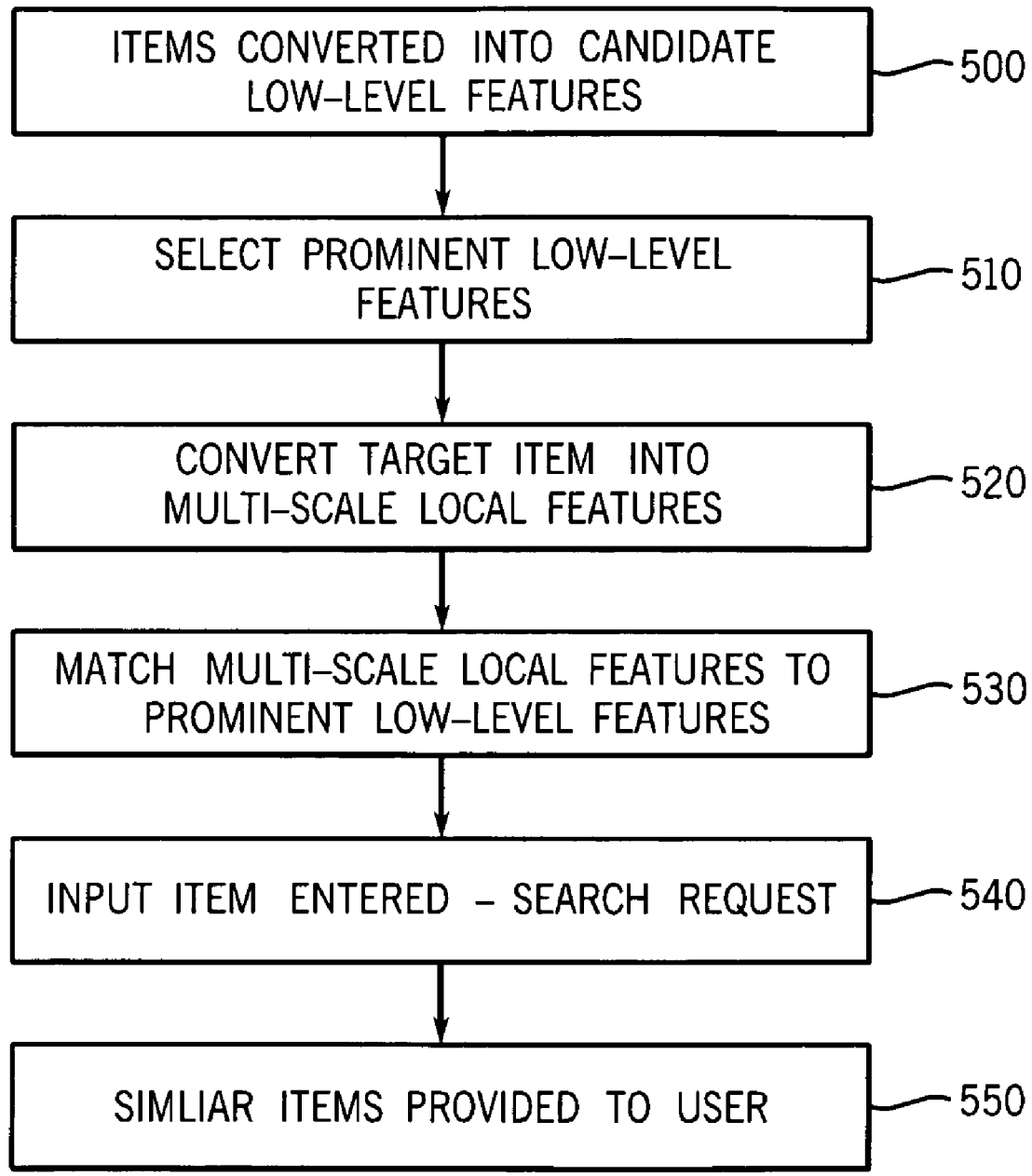
FIG. 5 is a flow chart showing the implementation of various embodiments of the present invention.

FIG. 5 is a flow chart showing the implementation of various embodiments of the present invention. At step 500 in FIG. 5, a plurality of images or other items are converted into a plurality of candidate low-level features. For each of the plurality of items, the candidate low-level features are extracted locally around salient points in the respective item. At step 510, a supervised learning approach of the type described above is used to select prominent low-level features from the plurality of candidate low-level features. The prominent low-level features are associated with predefined object categories. These predefined object categories can describe generic objects (e.g., cars, planes, etc.); parts of a person's body (e.g., faces), geographical landmarks (e.g., mountains, trees. etc.), or other items.

At step 520, when a new item is to be categorized, the target item is converted into a plurality of multi-scale local features.

At step 530, for each of the plurality of multi-scale local features, the multi-scale local feature is matched with the prominent low-level features using a probabilistic model. In this manner, for example, if the target item has a face, then this feature will be matched to the other items having a face and the item can be categorized accordingly.

At step 540, an input item is entered into the system by a user, requesting a search. The input item can comprise a template and/or a keyword for searching. Items that are similar to the input item are then provided to the user in response to the inquiry at step 550. As discussed above, the precise process can varying depending upon whether the user inputs only a keyword, only a template, or both. It should be noted that the search results can also comprise results of a search performed locally and/or at a remote location, and the items being searched can be located locally and/or remotely.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. The present invention can be implemented directly in software using any common programming language, e.g. C/C++ or assembly language. This invention can also be implemented in hardware and used in consumer devices. It should also be noted that the words "component" and "module" as used herein and in the claims is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of categorizing a plurality of items on a mobile electronic device, comprising:
   converting, by using a computer, a plurality of items into a plurality of candidate low-level features, for each of the plurality of items, the candidate low-level features being extracted locally around salient points in respective item;
   using a supervised learning approach to select prominent low-level features from the plurality of candidate low-level features, the prominent low-level features being associated with predefined object categories;
   converting a target item into a plurality of multi-scale local features; and
   for each of the plurality of multi-scale local features, matching the multi-scale local features with the prominent low-level features using a probabilistic model.

2. The method of claim 1, wherein the supervised learning approach comprises the Adaptive Boosting (AdaBoosting) learning algorithm.

3. The method of claim 1, wherein the supervised learning approach comprises the use of Bayesian statistics.

4. The method of claim 1, wherein the supervised learning approach comprises support vector machine (SVM) pattern recognition.

5. The method of claim 1, wherein the plurality of items comprise videos.

6. The method of claim 1, wherein the plurality of items comprise images.

7. The method of claim 1, wherein a multi-scale local feature is matched with a prominent low-level feature if a computed probability of a match between the multi-scale local feature and the prominent low-level feature is greater than a predetermined threshold.

8. The method of claim 7, wherein the predetermined threshold is determined through the use of the supervised learning approach.

9. The method of claim 1, further comprising: receiving an input from a user; and returning at least one item to the user that shares certain similarities with the input.

10. The method of claim 9, wherein the input comprises a keyword, and wherein the at least one item includes an annotation that is similar to the keyword.

11. The method of claim 9, wherein the input comprises a template item, and wherein low-level features in the input are compared to the prominent low-level features to identify the at least one item.

12. The method of claim 9, wherein the input comprises a template item and the keyword, and the returning of the at least one item comprises:
   pre-filtering low-level features in the template item using probabilistic models of interested categories; and
   matching the pre-filtered low-level features with target images in the same category, the category being identified by the keyword.

13. A computer program product, embodied on a memory, for categorizing a plurality of items on a mobile electronic device, the computer program product comprising:
   computer code for converting a plurality of items into a plurality of candidate low-level features, for each of the plurality of items, the candidate low-level features being extracted locally around salient points in respective item;
   computer code for using a supervised learning approach to select prominent low-level features from the plurality of candidate low-level features, the prominent low-level features being associated with predefined object categories;
   computer code for converting a target item into a plurality of multi-scale local features and
   computer code for, for each of the plurality of multi-scale local features, matching the multi-scale local features with the prominent low-level features using a probabilistic model.

14. The computer program product of claim 13, wherein a multi-scale local feature is matched with a prominent low-level feature if a computed probability of a match between the multi-scale local feature and the prominent low-level feature is greater than a predetermined threshold.

15. The computer program product of claim 14, wherein the predetermined threshold is determined through the use of the supervised learning approach.

16. The computer program product of claim 13, further comprising: computer code for receiving an input from a user; and computer code for returning at least one item to the user that share certain similarities with the input.

17. The computer program product of claim 16, wherein the input comprises a keyword, and wherein the at least one item includes an annotation that is similar to the keyword.

18. The computer program product of claim 16, wherein the input comprises a template item, and wherein low-level features in the input are compared to the prominent low-level features to identify the at least one item.

19. The computer program product of claim 16, wherein the input comprises a template item and the keyword, and the returning of the at least one item comprises:
   computer code for pre-filtering low-level features in the template item using probabilistic models of interested categories; and
   computer code for matching the pre-filtered low-level features with target images in the same category, the category being identified by the keyword.

20. An electronic device, comprising:
   a device unit and
   a memory operatively connected to the device unit and the memory including:
   computer code for converting a plurality of items into a plurality of candidate low-level features, for each of the plurality of items, the candidate low-level features being extracted locally around salient points in respective item;
   computer code for using a supervised learning approach to select prominent low-level features from the plurality of candidate low-level features, the prominent low-level features being associated with predefined object categories;
   computer code for converting a target item into a plurality of multi-scale local features; and
   computer code for, for each of the plurality of multi-scale local features, matching the multi-scale local features with the prominent low-level features using a probabilistic model.

21. The electronic device of claim 20, wherein a multi-scale local feature is matched with a prominent low-level feature if a computed probability of a match between the multi-scale local feature and the prominent low-level feature is greater than a predetermined threshold.

22. The electronic device of claim 21, wherein the predetermined threshold is determined through the use of the supervised learning approach.

23. The electronic device of claim 22, wherein the memory unit further comprises:
   computer code for receiving an input from a user; and
   computer code for returning at least one item to the user that shares certain similarities with the input.

* * * * *